US012570341B2

(12) United States Patent
    Zhu et al.

(10) Patent No.: US 12,570,341 B2
(45) Date of Patent:       Mar. 10, 2026

(54) BOTTOM SUPPORT STRUCTURE OF HAND TROLLEY AND HAND TROLLEY

(71) Applicant: Zhejiang Sunshine Leisure Products Co., Ltd., Jinhua City (CN)

(72) Inventors: Xiaohui Zhu, Jinhua City (CN); Zhipeng Zhang, Jinhua City (CN); Kun Yang, Jinhua City (CN)

(73) Assignee: Zhejiang Sunshine Leisure Products Co., Ltd., Junhua City (CN)

( * ) Notice: Subject to any disclaimer, the term of this patent is extended or adjusted under 35 U.S.C. 154(b) by 280 days.

(21) Appl. No.: 18/466,033

(22) Filed: Sep. 13, 2023

(65) Prior Publication Data

US 2024/0409141 A1     Dec. 12, 2024

(30) Foreign Application Priority Data

Jun. 6, 2023    (CN) .......................... 202321429980.8

(51) Int. Cl.
    *B62B 3/02*        (2006.01)
    *B62B 3/00*        (2006.01)
    *B62B 5/06*        (2006.01)

(52) U.S. Cl.
    CPC ................ *B62B 3/02* (2013.01); *B62B 3/002* (2013.01); *B62B 5/067* (2013.01); *B62B 2205/06* (2013.01)

(58) Field of Classification Search
    CPC .......... B62B 3/02; B62B 3/002; B62B 5/067; B62B 2205/06; B62B 3/025; B62B 3/007
    See application file for complete search history.

(56) References Cited

U.S. PATENT DOCUMENTS

| | | | | |
|---|---|---|---|---|
| 9,056,621 | B1 * | 6/2015 | Jin | .......................... B62B 3/027 |
| 9,073,564 | B2 * | 7/2015 | Yang | ...................... B62B 3/002 |
| 9,211,897 | B2 * | 12/2015 | Yang | ...................... B62B 3/001 |
| D929,063 | S * | 8/2021 | Zhang | ........................... D34/12 |

(Continued)

FOREIGN PATENT DOCUMENTS

| | | | |
|---|---|---|---|
| CN | 102390585 A | * | 3/2012 |
| CN | 106627690 A | | 5/2017 |

(Continued)

OTHER PUBLICATIONS

Translated CN-216805504-U (Year: 2025).*
Translated CN-218287797-U (Year: 2025).*

*Primary Examiner* — James A Shriver, II
*Assistant Examiner* — Ian Bryce Shelton
(74) *Attorney, Agent, or Firm* — Cooper Legal Group, LLC

(57)                  ABSTRACT

A bottom support structure of a hand trolley and the hand trolley are provided. The bottom support structure includes a bottom frame and ground wheels. The bottom frame includes one central joint, at least three groups of connection assemblies, and at least three corner joints, one end of each connection assembly is hingedly connected to the central joint, the other end of the connection assembly is hingedly connected to one corner joint, and the corner joint is connected to the ground wheel, so that a foldable structure that is selectively unfolded or folded of the bottom frame is formed. One of the connection assemblies includes a first connection piece and a second connection piece, and when the bottom frame is unfolded, the first connection piece is located on the second connection piece, so that a double-layer structure of the bottom frame is formed.

15 Claims, 12 Drawing Sheets

(56)         References Cited

U.S. PATENT DOCUMENTS

| | | | | |
|---|---|---|---|---|
| 11,667,313 B2 * | 6/2023 | Wu | .......................... | B62B 5/067 |
| | | | | 280/651 |
| 12,221,146 B2 * | 2/2025 | Yang | ...................... | B62B 5/067 |
| 2014/0001735 A1 * | 1/2014 | Yang | .......................... | B62B 3/02 |
| | | | | 280/651 |
| 2015/0151771 A1 * | 6/2015 | Jin | ........................ | B62B 5/0013 |
| | | | | 280/651 |
| 2015/0166091 A1 * | 6/2015 | Yang | .......................... | B62B 3/02 |
| | | | | 280/651 |
| 2023/0040903 A1 * | 2/2023 | Yang | ...................... | B62B 5/067 |
| 2023/0049293 A1 * | 2/2023 | Wu | .......................... | B62B 3/007 |
| 2024/0051589 A1 * | 2/2024 | Zhou | ..................... | B62B 5/0438 |
| 2024/0217572 A1 * | 7/2024 | Luo | .......................... | B62B 3/005 |
| 2024/0270298 A1 * | 8/2024 | Song | ..................... | B62B 5/067 |
| 2024/0286660 A1 * | 8/2024 | Luo | .......................... | B62B 3/022 |
| 2024/0300559 A1 * | 9/2024 | Zhou | ....................... | B62B 3/025 |

FOREIGN PATENT DOCUMENTS

| | | | | | | |
|---|---|---|---|---|---|---|
| CN | 216805504 U | * | 6/2022 | ............... | B62B 3/02 |
| CN | 114954599 A | * | 8/2022 | ............... | B62B 3/02 |
| CN | 217170735 U | | 8/2022 | | |
| CN | 218287797 U | * | 1/2023 | | |
| CN | 116118831 A | * | 5/2023 | ............... | B32B 3/02 |
| DE | 202019105298 U1 | * | 10/2019 | ............. | B62B 3/025 |

* cited by examiner

Unfolded state

Folded state

A1 A2

A3 A4

BOTTOM SUPPORT STRUCTURE OF HAND TROLLEY AND HAND TROLLEY

CROSS-REFERENCE TO RELATED APPLICATIONS

This application claims priority to Chinese Patent Application 202321429980.8, filed on Jun. 6, 2023, which is incorporated herein by reference.

TECHNICAL FIELD

The present invention relates to the field of hand trolleys, and specifically, to a bottom support structure of a hand trolley and the hand trolley.

BACKGROUND

For greater strength, an existing foldable hand trolley on the market are usually designed with a relatively large quantity of rods, such as the Chinese document CN201610742284.0 and the Chinese document CN202220975897.X. Because a bottom frame is of a single-layer structure, the bottom frame wobbles. To improve stability of the bottom frame, support rods are usually designed on a side surface. During folding, to make the support rod on the side surface be smoothly folded, a telescopic rod need to be disposed. As the folding progresses, the telescopic rod protrudes upward. Consequently, a height obtained after the folding is increased, thereby making the hand trolley inconvenient to carry the hand trolley. For some foldable hand trolleys, to pursue a smaller folding volume to make the hand trolley convenient to carry, structural parts of a support are designed to be thinner or a quantity of structural parts is reduced. However, strength of the hand trolley is also reduced. Therefore, it is difficult for the existing hand trolley to take strength and carrying convenience into account.

SUMMARY

The present invention is aimed to provide a support of a hand trolley and the hand trolley, to resolve the foregoing problem that it is difficult for an existing hand trolley to take strength and carrying convenience into account.

To implement the foregoing objective, a technical solution of the present invention is as follows: A bottom support structure of a hand trolley, including a bottom frame and ground wheels disposed under the bottom frame, where the bottom frame includes one central joint, at least three groups of connection assemblies, and at least three corner joints, one end of each connection assembly is hingedly connected to the central joint, the other end of the connection assembly is hingedly connected to one corner joint, and the corner joint is connected to the ground wheel, so that the bottom frame forms a foldable structure that is selectively unfolded or folded; and one of the connection assemblies includes a first connection piece and a second connection piece, and when the bottom frame is unfolded, the first connection piece is located on the second connection piece, so that the bottom frame forms a double-layer structure.

In the present invention, when the bottom frame is unfolded, the first connection piece and the second connection piece can jointly bear pressure of a heavy object placed on the bottom frame, thereby improving a carrying capability of the bottom frame. The double-layer structure of the bottom frame can maintain stability of the bottom frame without disposing an excessively large quantity of support rods on a side surface, so that a telescopic rod originally selected for folding can be changed to a fixed rod, thereby reducing a height obtained after the hand trolley is folded, and making the hand trolley convenient to carry.

The present invention further provides a hand trolley, including a support, a pull rod, and tarpaulin disposed on the support. The support includes a bottom support structure of the hand trolley and a side support disposed on a bottom frame. The tarpaulin is connected to the support to form a container with a top opening, a bottom closure, and a side surface closure. The pull rod is disposed on one side of the container. The side support includes a side rod disposed at a corner joint of the bottom frame, and the side rod is a fixed rod with a fixed height.

The present invention has the following beneficial effects: In the present invention, a double-layer structure of the bottom frame is formed by using the connection assembly, thereby improving strength and stability of the bottom frame, and further improving strength of the hand trolley. In addition, a side surface of the hand trolley hardly bears pressure of a heavy object inside the hand trolley. When a bottom portion of the hand trolley is strong enough, a structure on the side surface of the hand trolley can be simplified. The side rod of the side support may use the fixed rod, so that the height obtained after the hand trolley is folded can be reduced, thereby making the hand trolley convenient to carry.

3

1 bottom frame, 11 central joint, 110 hinge portion, 111 first hinge hole, 112 third hinge hole, 113 first limiting portion, 114 connection portion, 115 handle fixing hole, 12 connection assembly, 121 first connection piece, 1211 first bending portion, 122 second connection piece, 1221 second bending portion, 13 corner joint, 131 second hinge hole, 132 fourth hinge hole, 133 second limiting portion, 134 side support connection portion, 14 transverse rod, 2 ground wheel, 3 side support, 31 side rod, 32 edge rod, 33 top joint, 331 edge rod top end connection portion, 34 movable joint, 341 edge rod bottom end connection portion, 4 pull rod, A1 first rotation center, A2 second rotation center, A3 third rotation center, and A4 fourth rotation center.

DESCRIPTION OF EMBODIMENTS

To further describe various embodiments, the present invention provides accompanying drawings. The accompanying drawings are a part of disclosed content of the present invention, are mainly used to describe the embodiments, and can be combined with related descriptions in the specification to explain operating principles of the embodiments. With reference to the content, a person of ordinary skill in the art should be able to understand other possible implementations and advantages of the present invention. Assemblies in the figures are not drawn to scale, and similar assembly symbols are generally used to denote similar assemblies.

Figure 1:
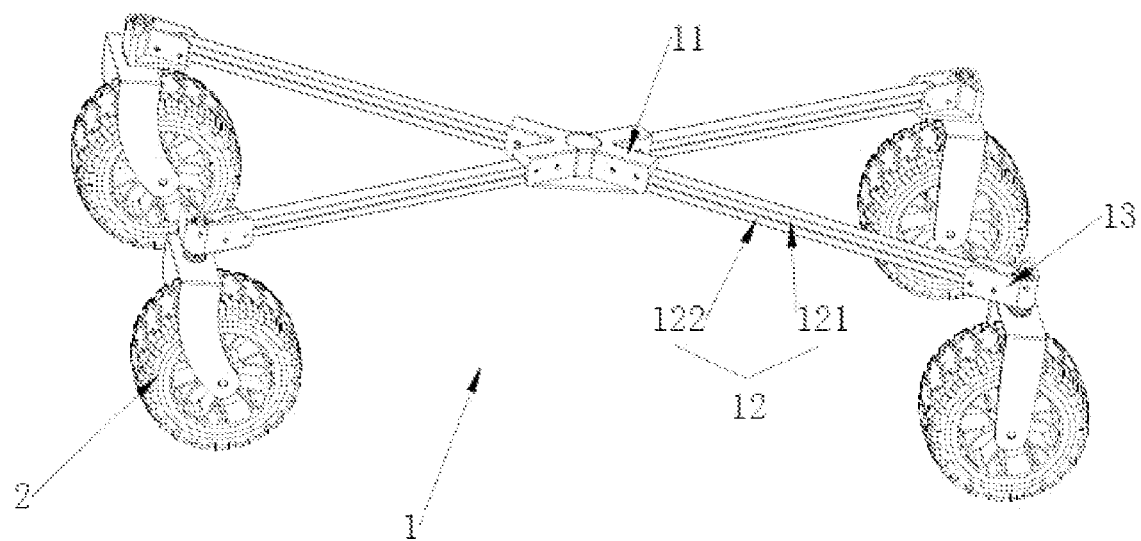
FIG. 1 is a three-dimensional diagram of a bottom support structure according to an embodiment of the present invention.

As shown in FIG. 1, in an embodiment of the present invention, a bottom support structure of a hand trolley is provided, including a bottom frame 1 and ground wheels 2 disposed under the bottom frame 1. The bottom frame 1 includes one central joint 11, four groups of connection assemblies 12, and four corner joints 13, and the bottom frame 1 is of a double-layer structure. One end of each connection assembly 12 is hingedly connected to the central joint 11, the other end of the connection assembly 12 is hingedly connected to one corner joint 13, and each corner joint 13 is fixedly connected to one ground wheel 2. The corner joints 13 are arranged at intervals around the central joint 11 to form the bottom frame 1 of a rectangular structure, the four corner joints 13 are respectively located at four corners of a rectangle, and the central joint 11 is located at a center of the rectangle, so that the bottom frame 1 forms a foldable structure that is selectively unfolded or folded. When the bottom frame 1 is folded, the central joint 11 moves upward to drive the connection assemblies to rotate relative to the central joint 11 and the corner joint 13 respectively, and the corner joint 13 and the ground wheel 2 move towards a direction close to the central joint 11.

A structure of each connection assembly 12 is the same. The structure of the connection assembly 12 is described below by using one of the connection assemblies 12 as an example.

Figure 2:
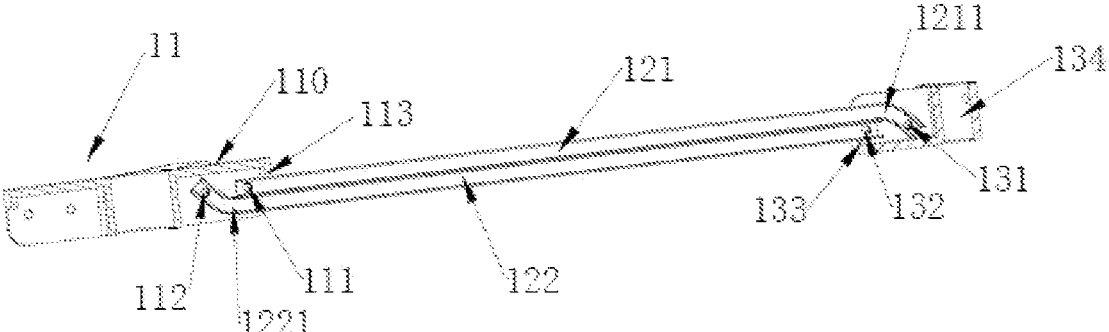
FIG. 2 is a schematic structural sectional diagram of connecting a group of connection assemblies to a central joint and a corner joint.
Figure 3:
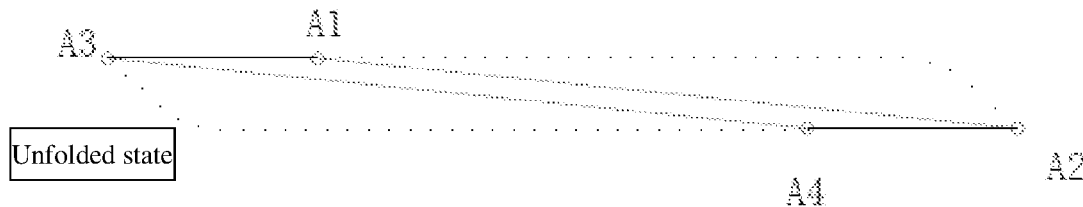
FIG. 3 is a schematic diagram of a folding change of a parallelogram formed by connection assemblies according to an embodiment.
Figure 3:
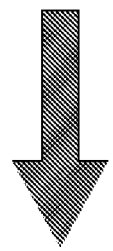
Figure 3:
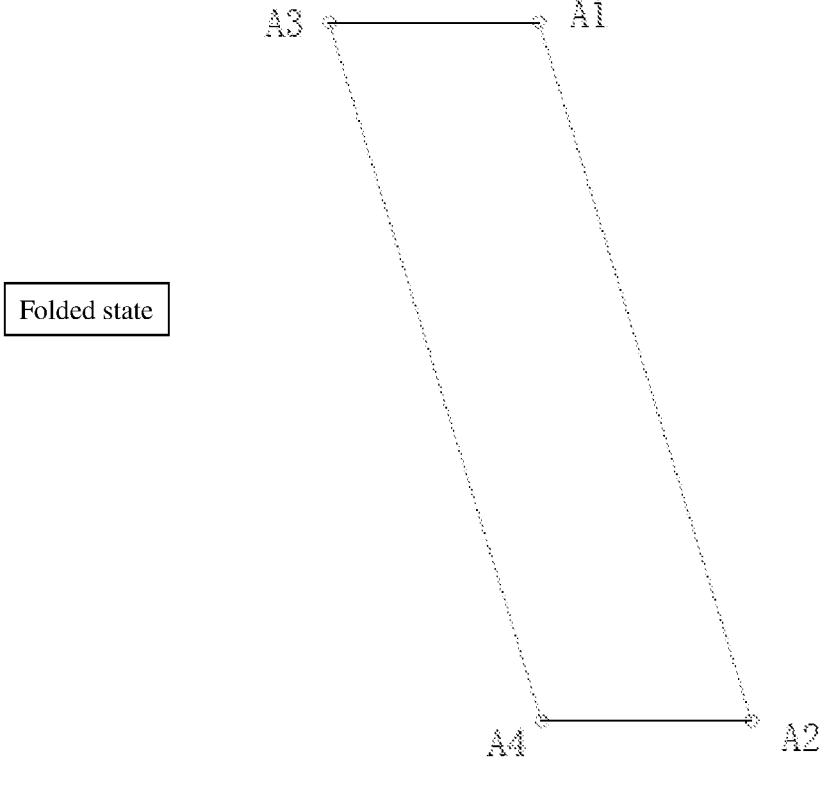

As shown in FIG. 1 to FIG. 3, one of the connection assemblies 12 includes a first connection piece 121 and a second connection piece 122. When the bottom frame 1 is unfolded, the first connection piece 121 is located on the second connection piece 122, so that the bottom frame 1 forms a double-layer structure. Preferably, the first connection piece 121 abuts against an upper end of the second connection piece 122. Therefore, the second connection piece 122 can play a role of supporting the first connection piece 121, thereby increasing strength of the connection piece 121, thereby increasing strength of the connection assembly, and further increasing bearing strength and stability of the bottom frame 1 of the hand trolley. One end of the first connection piece 121 is hingedly connected to the central joint 11 to form a first rotation center A1, and the other end of the first connection piece 121 is hingedly connected to the corner joint 13 to form a second rotation center A2. One end of the second connection piece 122 is hingedly connected to the central joint 11 to form a third rotation center A3, and the other end of the second connection piece 122 is hingedly connected to the corner joint 13 to form a fourth rotation center A4. The first rotation center A1, the second rotation center A2, the third rotation center A3, and the fourth rotation center A4 are sequentially connected to form a parallelogram. Each connection assembly 12 is connected to the central joint 11 and the corner joint 13 to form a parallelogram. According to a deformable characteristic of the parallelogram, the first connection piece 121 and the second connection piece 122 can move as a relative position of the central joint 11 and the corner joint 13 changes, in to achieve a foldable effect of the bottom frame 1.

In another embodiment, the first rotation center A1, the second rotation center A2, the third rotation center A3, and the fourth rotation center A4 are sequentially connected to form a trapezoid or another quadrilateral, and two opposite sides of the quadrilateral are parallel, that is, a line connecting the first rotation center A1 and the third rotation center A3 is parallel to a line connecting the second rotation center A2 and the fourth rotation center A4, and a distance between the first rotation center A1 and the third rotation center A3 is smaller than a distance between the second rotation center A2 and the fourth rotation center A4. In this case, in a folded state, a width of a lower portion of the connection assembly is greater than a width of an upper portion, so that the bottom support structure is more stable when folded. To enable the first connection piece 121 to practically abut against the upper portion of the second connection piece 122 during unfolding of the bottom frame to increase strength of the bottom frame, one end that is of the first connection piece 121 and that is close to the second rotation center A2 and one end that is of the second connection piece 122 and that is close to the fourth rotation center A4 may be thickened accordingly.

The central joint 11 is provided with four hinge portions 110. The four hinge portions 110 encircle to make the central joint 11 form an "X" shape, so that each hinge portion 110 faces towards the corner joint 13. Each hinge portion 110 and one connection assembly 12 form a hinged connection. Specifically, a first hinge hole 111 and a third hinge hole 112 are provided on each hinge portion 110, and the first hinge hole 111 is hingedly connected to the first connection piece 121, so that a center of the first hinge hole 111 is the first rotation center A1. The third hinge hole 112 is hingedly connected to the second connection piece 122, so that a center of the third hinge hole 112 is the third rotation center A3. With a direction relatively close to the central joint 11 as an inner side and a direction relatively far away from the central joint 11 as an outer side, the first hinge hole 111 is provided on the outer side relative to the third hinge hole 112. When the bottom frame is unfolded, the first connection piece 121 is disposed on the second connection piece 122. When the bottom frame 1 is folded to enable the central joint 11 to move upward, the first connection piece 121 and the second connection piece 122 rotate downward relative to the central joint 11. Therefore, the first hinge hole 111 is provided on the outer side relative to the third hinge hole 112, so that interference from the first connection piece 121 and the second connection piece 122 can be avoided, and the bottom frame 1 can be folded smoothly.

Further, a second hinge hole 131 and a fourth hinge hole 132 are provided on the corner joint 13, and the second hinge hole 131 is hingedly connected to the first connection piece 121, so that a center of the second hinge hole 131 is the second rotation center A2. The fourth hinge hole 132 is hingedly connected to the second connection piece 122, so that a center of the fourth hinge hole 132 is the fourth rotation center A4. The second hinge hole 131 is provided on an outer side relative to the fourth hinge hole 132. When the bottom frame is unfolded, the first connection piece 121 is disposed on the second connection piece 122. When the bottom frame 1 is folded to enable the central joint 11 to move upward, the first connection piece 121 and the second connection piece 122 rotate upward relative to the corner joint 13. Therefore, the second hinge hole 131 is provided on the outer side relative to the fourth hinge hole 132, so that interference from the first connection piece 121 and the second connection piece 122 can be avoided, and the bottom frame 1 can be folded smoothly.

As shown in FIG. 2 and FIG. 3, in an embodiment, the first hinge hole 111 and the third hinge hole 112 are provided at a same height, and the second hinge hole 131 and the fourth hinge hole 132 are provided at a same height. In other words, both a line connecting A1 and A3 and a line connecting A2 and A4 extend along a horizontal direction. To form a parallelogram, a line connecting A1 and A2 and a line connecting A3 and A4 need to be oblique lines at an angle to the horizontal direction, that is, there is always a height difference between the first hinge hole 111 and the second hinge hole 131. Both the first connection piece 121 and the second connection piece 122 are in a long strip shape. The first connection piece 121 is bent downward at a location close to the second hinge hole 131, to form a first bending portion 1211. The second connection piece 122 is bent upward at a location close to the third hinge hole 112, to form a second bending portion 1221. Specifically, both the first connection piece 121 and the second connection piece 122 are metal tubes, and may be square tubes or round tubes. Preferably, to reduce a weight of the hand trolley, both the first connection piece 121 and the second connection piece 122 use hollow tubes.

Figures 4, 5:
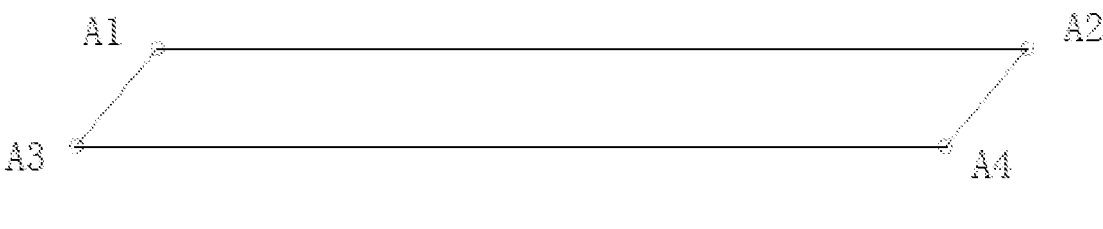
FIG. 4 is a schematic diagram of a parallelogram formed by a connection assembly according to another embodiment.
FIG. 5 is a schematic structural sectional diagram of the connection assembly according to the embodiment shown in FIG. 4.

As shown in FIG. 4 and FIG. 5, in another embodiment, the first hinge hole 111 is relatively higher than the third hinge hole 112, and the second hinge hole 131 is relatively higher than the fourth hinge hole 132. In other words, the line connecting A1 and A3 and the line connecting A2 and A4 are oblique lines at an angle to each other along the horizontal direction. In this case, the line connecting A1 and A2 and the line connecting A3 and A4 may extend along the horizontal direction or may be oblique lines. In this case, both the first connection piece 121 and the second connection piece 122 are linear. Formation of a quadrilateral structure such as a parallelogram or a trapezoid is not affected. In addition, a structure of the first connection piece 121 and a structure of the second connection piece 122 can be simplified, so that the first connection piece 121 and the second connection piece 122 are more simply manufactured. Specifically, both the first connection piece 121 and the second connection piece 122 are straight metal tubes, and may be square tubes or round tubes. Preferably, to reduce the weight of the hand trolley, both the first connection piece 121 and the second connection piece 122 use hollow tubes.

Figure 6:
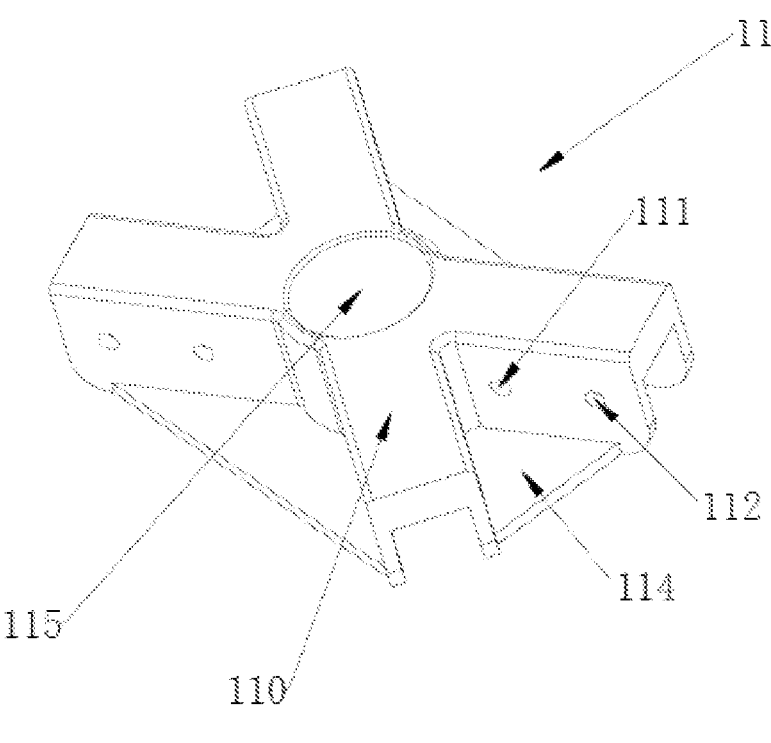
FIG. 6 is a three-dimensional diagram of a central joint.

As shown in FIG. 2 and FIG. 6, the hinge portion 110 is in a shape of a groove with an opening downward, each of the first hinge hole 111 and the third hinge hole 112 is provided on a side wall of the groove, a first limiting portion 113 is disposed on a top wall of the groove, and when the bottom frame 1 is unfolded, the connection assembly 12 abuts against the first limiting portion 113. Specifically, a flange extending downward is disposed on the top wall of the groove. When the bottom frame 1 is unfolded, the first connection piece 121 of the connection assembly 12 abuts against the flange, to limit the first connection piece 121 moving upward relative to the central joint 11, that is, the flange forms the first limiting portion 113, thereby playing a role of locking the bottom frame 1. In addition, the second connection piece 122 has the second bending portion 1221 bent upward, so that a tail end of the second connection piece 122 is higher than the first connection piece 121. Therefore, during folding of the bottom frame 1, interference exists between the tail end of the second connection piece 122 and the top wall of the groove, and existence of the flange makes the third hinge hole 112 be spaced from the top wall of the groove of the hinge portion 110 to accommodate movement of the second connection piece 122.

A bottom frame connection portion 130 is disposed on the corner joint 13, the bottom frame connection portion 130 is in a shape of a groove with an opening upward, each of the second hinge hole 131 and the fourth hinge hole 132 is provided on a side wall of the groove, a second limiting portion 133 is disposed on a bottom wall of the groove, and when the bottom frame is unfolded, the connection assembly 12 abuts against the second limiting portion 133. Specifically, a flange extending upward is disposed on the bottom wall of the groove. When the bottom frame 1 is unfolded, the second connection piece 122 of the connection assembly 12 abuts against the flange, to limit the second connection piece 122 moving downward relative to the corner joint 13, that is, the flange forms the second limiting portion 133, thereby playing a role of locking the bottom frame 1. In addition, the first connection piece 121 has the first bending portion 1211 bent downward, so that a tail end of the first connection piece 121 is lower than the second connection piece 122. Therefore, during folding of the bottom frame 1, interference exists between the tail end of the first connection piece 121 and the bottom wall of the groove, and existence of the flange makes the second hinge hole 131 be spaced from the bottom wall of the groove of the bottom frame connection portion 130 to accommodate movement of the first connection piece 121.

Figure 11:
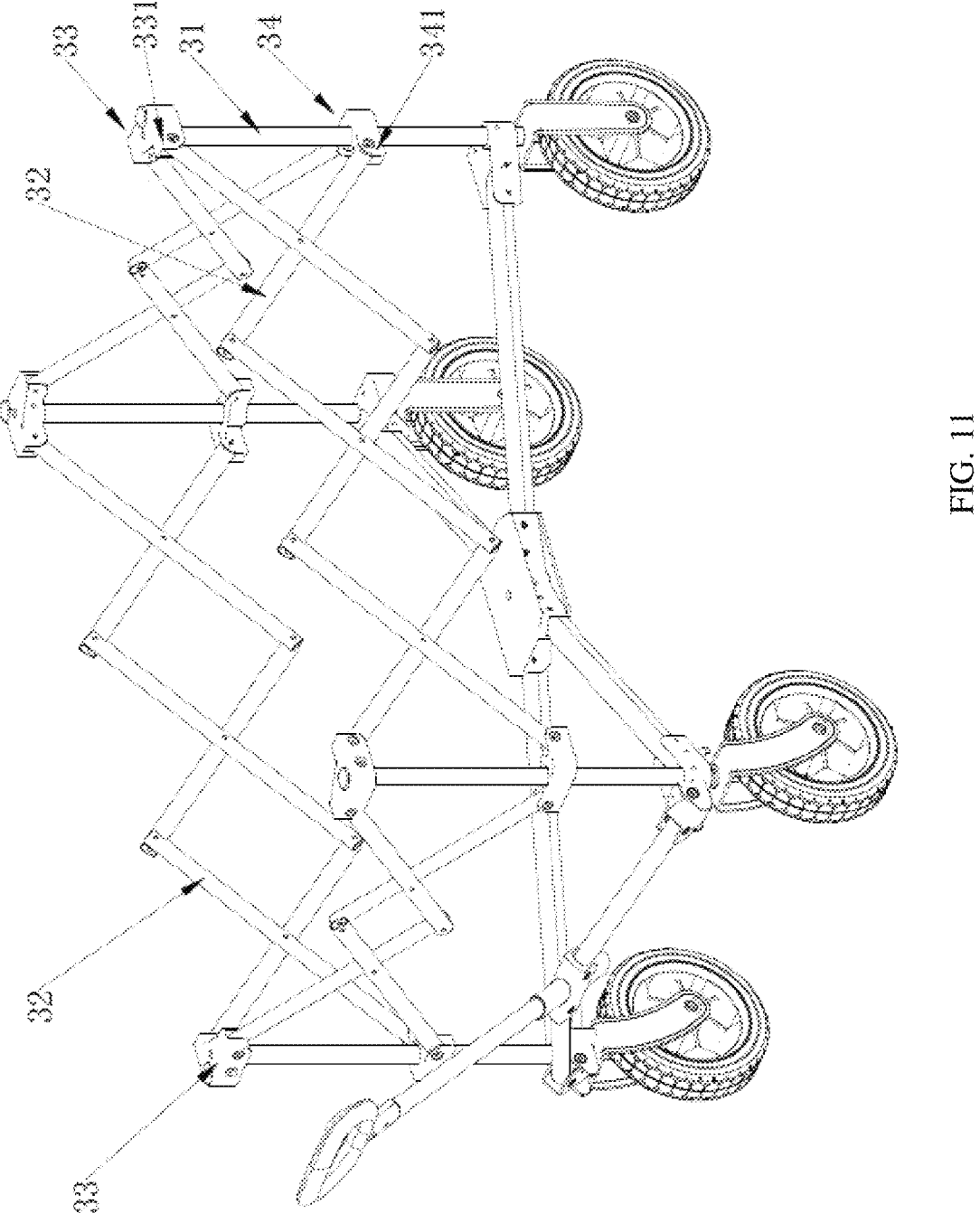
FIG. 11 is a three-dimensional diagram of a hand trolley with a fence in an unfolded state according to the present invention.

As shown in FIG. 6, connection portions 114 are disposed between the four hinge portions 110 of the central joint 11, so that the four hinge portions 110 are integrally connected. The central joint 11 may be integrally formed, and the hinge portion 110 and the connection portion 114 are integrated. The central joint 11 may alternatively be spliced by a plurality of parts. For example, a plurality of hinge portions 110 are fixed with the connection portions 114 through soldering. The connection portion 114 may be disposed between the hinge portions 110 (one connection portion 114 formed by a connection plate is disposed between every two adjacent hinge portions 110), or may be disposed on the hinge portion 110 (one large connection plate is fixed with all the hinge portions 110 through a connection, and the connection plate forms the connection portion 114). The connection portion 114 shown in FIG. 6 is disposed between adjacent hinge portions 110 and is located at a lower portion of the hinge portion 110. FIG. 11 is based on FIG. 6, and a connection plate is added on the hinge portion 110. The connection plate is fixed with all the hinge portions 110 through a connection, and the connection plate forms the connection portion 114.

It should be noted that, the bottom frame 1 is not limited to the foregoing rectangular structure, and may be of a triangular structure, so that three ground wheels are used to form a three-wheel hand trolley. Correspondingly, there are also three hinge portions 110 of the central joint 11, three corner joints 13, and three connection assemblies 12. In addition, the bottom frame 1 may alternatively be of another structure different from a triangle and a rectangle, such as a square or another polygon. Correspondingly, it is feasible that there are at least three ground wheels 2, at least three hinge portions 110 of the central joint 11, at least three corner joints 13, and at least three connection assemblies 12 to form a stable hand trolley.

As shown in FIG. 7 to FIG. 10 and FIG. 14, the present invention further provides a hand trolley, including a support, ground wheels 2, a pull rod 4, and a tarpaulin 5 disposed on the support. The support includes the bottom frame 1 and a side support 3 disposed on the bottom frame 1. The tarpaulin 5 is connected to the support to form a container 6 with a top opening, a bottom closure, and a side surface closure, and the pull rod 4 is disposed on one side of the container 6. A handle fixing hole 115 is provided at a center formed through encircling by the hinge portions 110 of the central joint 11. A handle 61 is further disposed at an inner bottom of the container 6. A through hole 51 is opened on the tarpaulin 5. A lower end of the handle 61 passes through the through hole 51 on the tarpaulin 5 to be connected to the handle fixing hole 115 of the central joint 11. The hand trolley in an unfolded state can be folded by pulling the handle 61.

Figure 7:
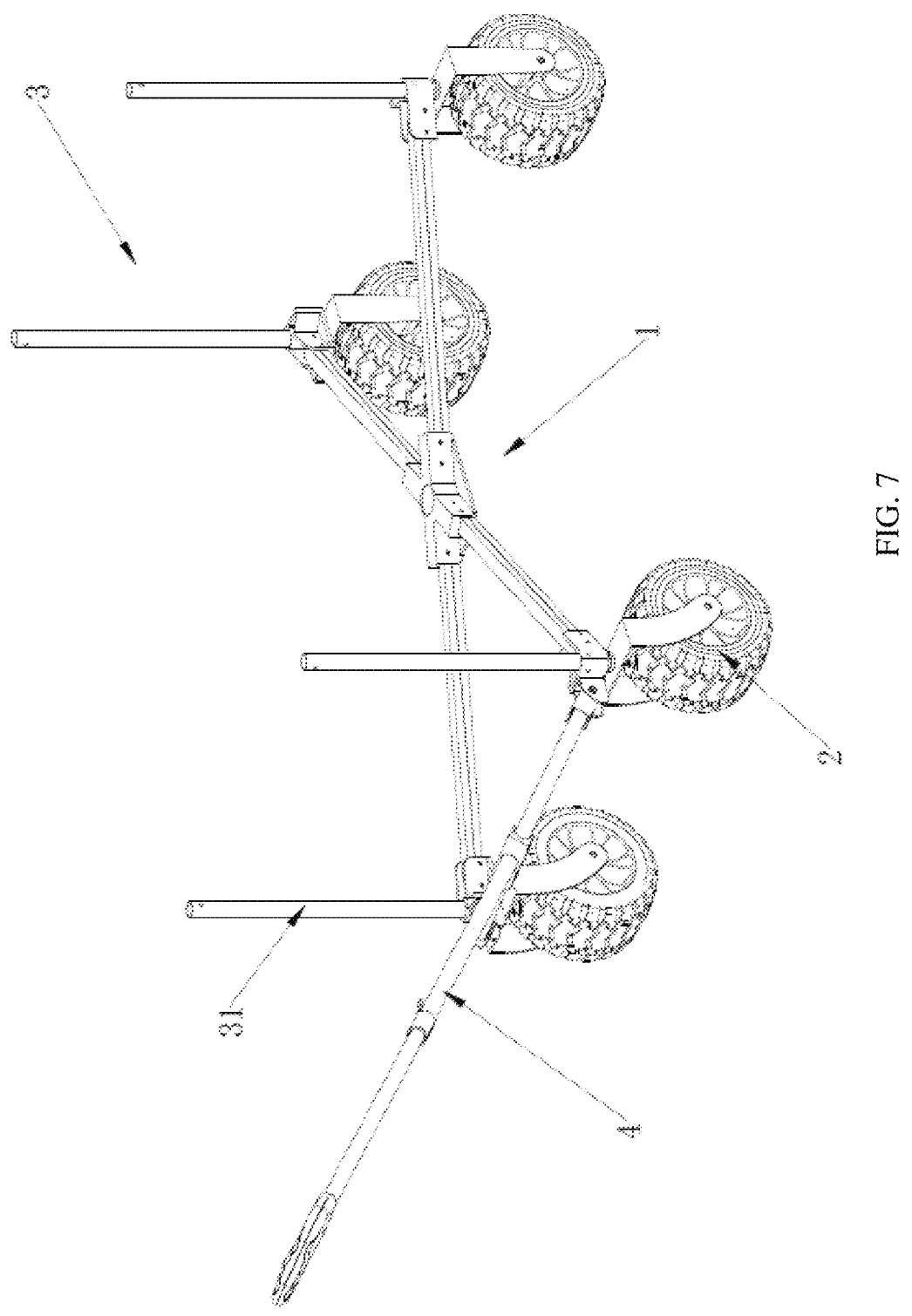
FIG. 7 is a three-dimensional diagram of a hand trolley in an unfolded state according to the present invention.
Figure 8:
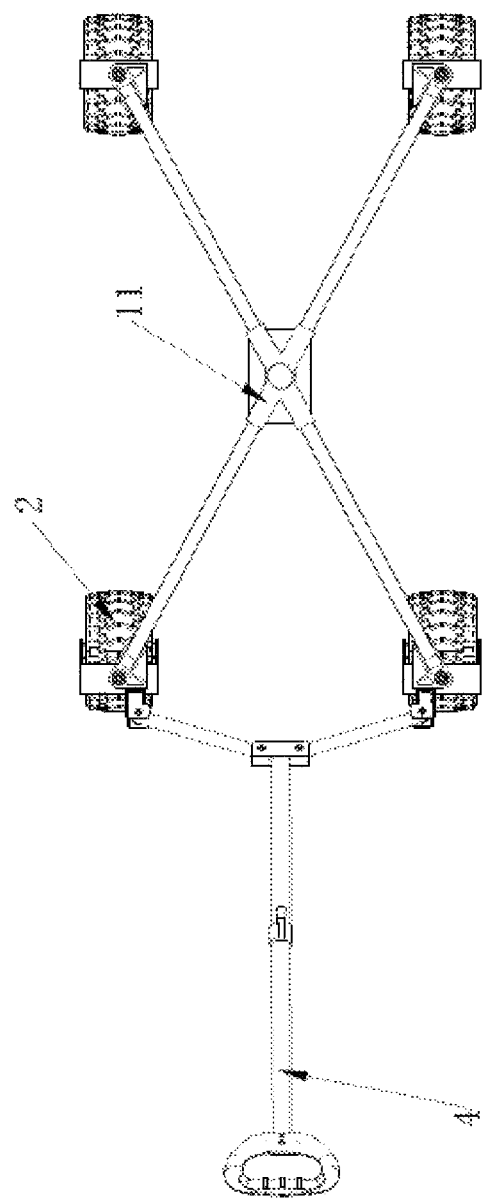
FIG. 8 is a top view of a hand trolley in an unfolded state according to the present invention.
Figure 9:
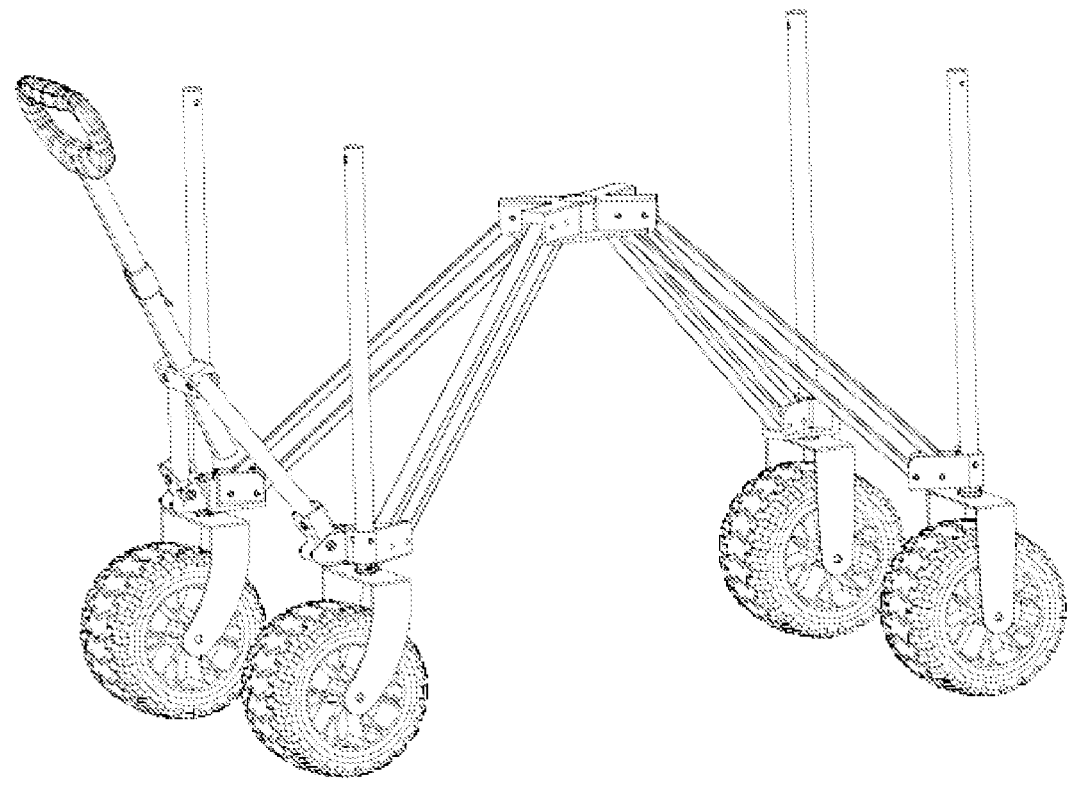
FIG. 9 is a three-dimensional diagram of a hand trolley in a semi-folded state according to the present invention.
Figure 10:
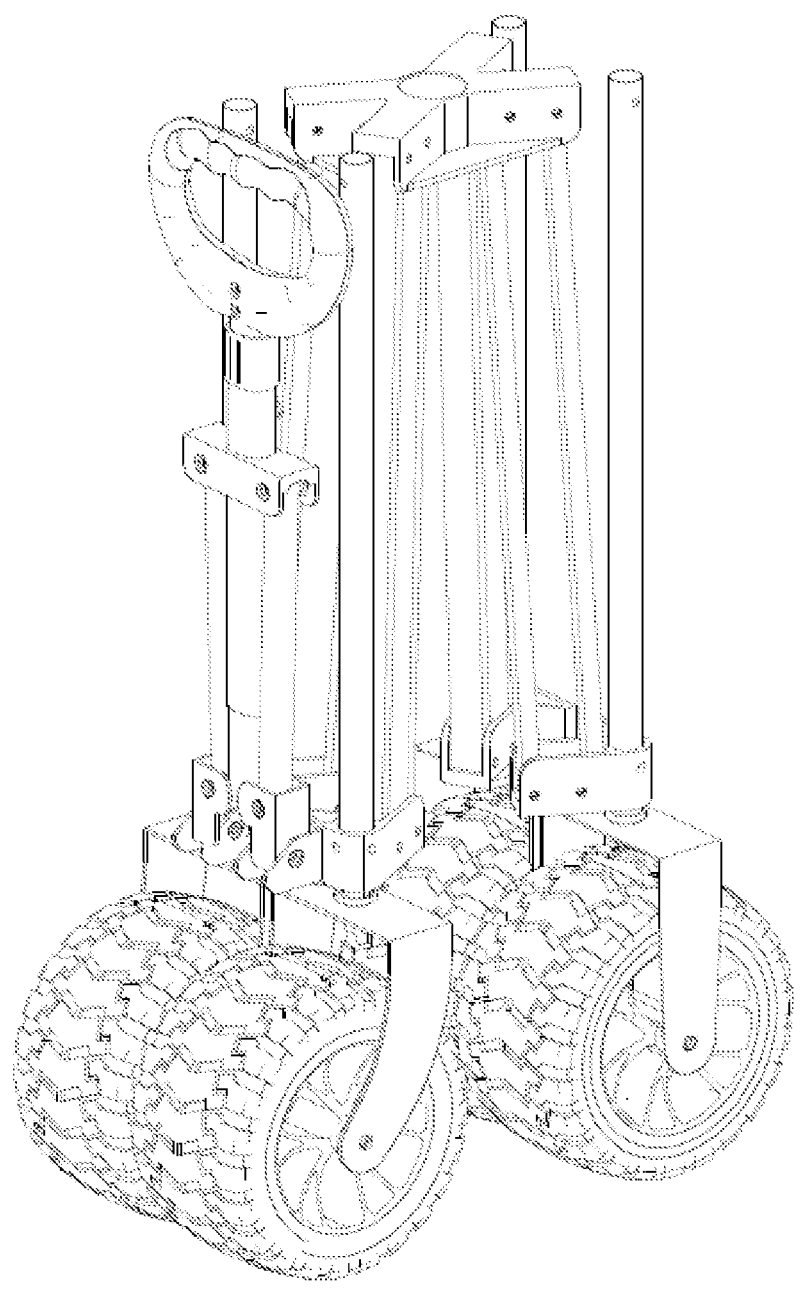
FIG. 10 is a three-dimensional diagram of a hand trolley in a folded state according to the present invention.

As shown in FIG. 2 and FIG. 7, the corner joint 13 further includes a side support connection portion 134, the side support 3 includes a plurality of side rods 31, and a lower end of the side rod 21 is fixedly connected to the side support connection portion 134. Specifically, a through hole is provided on the side support connection portion 134, and the side rod 31 is inserted into the through hole and is fixed through a small hole on a side surface. The ground wheel 2 is further inserted into the lower end of the side rod 31, so that each of the corner joints 13 is fixedly connected to one ground wheel 2. The side rod 31 is a non-telescopic fixed rod. All structural parts participating in folding of the hand trolley are disposed on the bottom frame 1 and have no direct connection relationship with a top portion of the side rod 31. Therefore, the side rod 31 may use the non-telescopic fixed rod to reduce a height of the folded hand trolley. In addition, even if all the structural parts participating in the folding of the hand trolley move upward, such as the central joint 11 and the connection assembly 12, because the structural parts are located at a bottom portion of the container when the hand trolley is in an unfolded state, the height of the folded hand trolley can be effectively controlled to stay within a relatively low range as long as a length of the connection assembly 12 is controlled. Preferably, the height of the folded hand trolley does not exceed a height of the top portion of the side rod 31 when the hand trolley is unfolded.

It should be noted that the side support 3 is not limited to a structure formed by the foregoing four side rods 31. To maintain strength of tarpaulin on a side surface, and to prevent goods on the hand trolley from falling from the side surface because the tarpaulin is too soft, another structural part is disposed between the side rods 31, such as a plurality of rods parallel to the side rod 31, or a plurality of cross-folded rods. A blocking piece disposed between the side rods 31 is a conventional technology in the prior art, and is not repeated herein.

A storage belt is further disposed on the hand trolley. When the hand trolley is folded, the storage belt is wrapped around the outside of the hand trolley in the folded state, so that the hand trolley maintains the folded state for convenient carrying.

As shown in FIG. 7, two transverse rods 14 are disposed between two of the corner joints 13 of the bottom frame 1. One end of each of the two transverse rods 14 is hingedly connected to one corner joint 13 and the other end of each of the two transverse rods 14 is hingedly connected to each other. The pull rod 4 is a telescopic rod, and a lower end of the pull rod 4 is connected to the transverse rod 14, so that the hand trolley can be pulled to move or to be folded when needed.

When the hand trolley is folded, although a double-layer structure of the bottom frame 1 can increase, to an extent, a width obtained after folding, a size of the ground wheel is very large relative to another structural part of the support. Therefore, a width of the folded hand trolley is determined by the size of the ground wheel, and there is a gap between the structural parts during folding. In the present invention, the size of the ground wheel 2 is constant. Compared with a traditional bottom frame 1 of a single-layer structure, the width obtained after the hand trolley described in the present invention is folded is basically unchanged. However, the side support 3 in the present invention needs to maintain only strength of the tarpaulin on the side surface, to prevent goods on the hand trolley from falling from the side surface because the tarpaulin is too soft. Therefore, the side rod of the side support 3 may use a non-telescopic fixed rod, so that the height of the folded hand trolley is reduced, making the hand trolley more convenient to carry.

Folding operation steps of the hand trolley are as follows: As shown in FIG. 7 to FIG. 10, pull the handle upward to drive the central joint 11 to move upward. The ground wheel 2 is driven by the connection assembly 12 and the corner joint 13 to move towards a direction close to the central joint 11, so that the support and the tarpaulin of the hand trolley are folded. The pull rod 4 is contracted downward and the contracted pull rod 4 abuts against one side of the support. The storage belt is wrapped around the outside of the hand trolley, to complete the folding of the hand trolley.

To unfold the hand trolley, the above folding steps only need to be carried out in reverse. After the central joint 11 is pressed in place, the hand trolley is locked by the first limiting portion 113 and the second limiting portion 133.

To maintain strength of the tarpaulin on the side surface and prevent goods on the hand trolley from falling from the side surface because the tarpaulin is too soft, a side blocking structure is disposed between the side rods 31. The side blocking structure is of a telescopic structure formed by a plurality of cross-folded rods, and contracts with the folding of the hand trolley or elongates with the unfolding of the hand trolley. The side blocking structure is disposed in an encircling manner to form a fence of the hand trolley. In an unfolded state of the hand trolley, the side blocking structure is located on an upper half of the side rod 31. A top end of the side blocking structure forms a hinged connection relationship with a top end of the side rod 31, and a lower end of the side blocking structure forms a compound connection relationship of a sliding connection and a hinged connection to the side rod 31. With the folding of the hand trolley, the side blocking structure is gradually contracted and extends downward. Because a length of the side rod 31 is fixed, compared with a height obtained during unfolding, the height of the hand trolley during folding does not increase, thereby making the hand trolley convenient to carry.

As shown in FIG. 11, the side blocking structure includes a plurality of edge rods 32. The edge rods 32 are in pairs.

Middle portions of the edge rods 32 in a same group are hingedly connected to each other to form an X-shaped cross structure. A group of X-shaped cross structures is used as a unit, and the adjacent edge rods 32 are connected end to end, so that a plurality of X-shaped cross structures form a group of telescopic side blocking structures. In this example, the bottom frame is of a rectangular structure, a side blocking structure located on a long edge of a rectangle includes three X-shaped cross structures, a side blocking structure located on a short edge of the rectangle includes two X-shaped cross structures, and top ends of adjacent X-shaped cross structures may be used as supports of the tarpaulin, thereby improving stability of the tarpaulin on the side surface. In a telescopic direction of the side blocking structure, a top end of the edge rod 32 at an end portion of the side blocking structure and the top end of the side rod 31 form a hinged connection relationship, and a bottom end of the edge rod 32 at the end portion of the side blocking structure and the side rod 31 form a compound connection relationship of a sliding connection and a hinged connection. A specific structure is as follows: A top joint 33 is disposed at the top end of the side rod 31, a blind hole is provided on a middle portion of the top joint 33, and the blind hole is provided at the top end of the side rod 31 to form an axial fixed connection to the side rod 31. The top joint 33 extends outward to form two edge rod top end connection portions 331, and edge rod top end connection portions 331 of a same top joint 33 is hingedly connected to top ends of adjacent edge rods 32 respectively, so that the top end of the side blocking structure forms a hinged connection relationship with the top end of the side rod 31. A movable joint 34 is disposed on a middle portion of the side rod 31, a through hole is provided at a middle portion of the movable joint 34, and an inner diameter of the through hole is greater than an outer diameter of the side rod 31. The through hole is sleeved outside the side rod 31 to form a sliding connection to the side rod. The movable joint 34 extends outward to form two edge rod bottom end connection portions 341, and edge rod bottom end connection portions 341 of a same movable joint 34 are hingedly connected to bottom ends of adjacent edge rods 32 respectively, so that the lower end of the side blocking structure and the side rod 31 form a compound connection relationship of a sliding connection and a hinged connection.

In the folded state of the hand trolley, top surfaces of top joints 33 are located on a same horizontal plane, the central joint 11 of the bottom support structure is lower than the horizontal plane, and the top end of the side blocking structure is hingedly connected to the top joint 33. When the hand trolley is folded, the side blocking structure extends downward. Therefore, a height of the side blocking structure does not exceed the top joint 33, so that a height of the top end of the side rod is a total height of the folded hand trolley, thereby ensuring that the height of the folded hand trolley is relatively small, and facilitating storage and carrying.

In addition, each side blocking structure disposed between the side rods 31 described in this embodiment is connected by a plurality of X-shaped cross structures formed by more than two edge rods 32. In another embodiment, one X-shaped cross structure formed through a hinged connection between middle portions of two edge rods 32 may also serve as one complete side blocking structure. The side blocking structure disposed in this way has a larger height in the folded state, but a smaller transverse size. In addition, because a quantity of edge rods 32 is reduced, an overall structure of the hand trolley is more concise.

Figure 12:
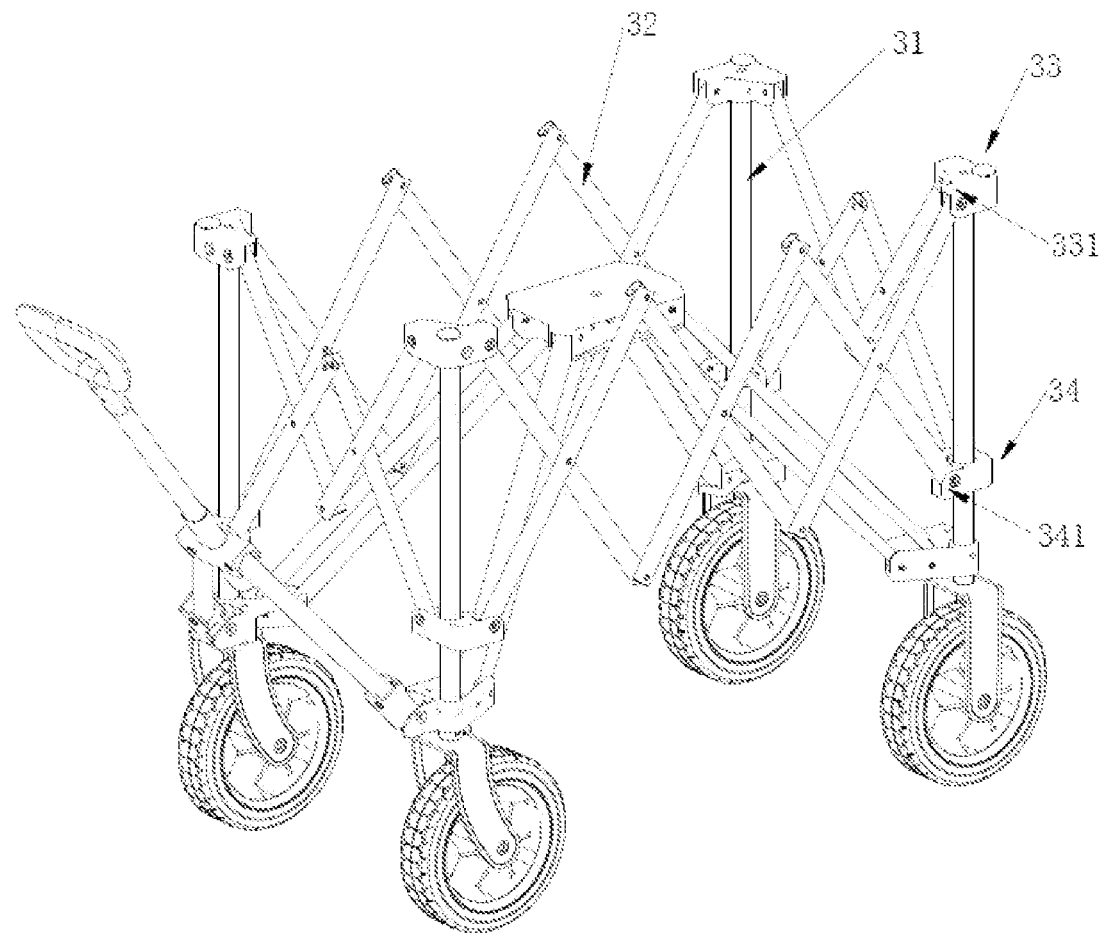
FIG. 12 is a three-dimensional diagram of a hand trolley with a fence in a semi-folded state according to the present invention.
Figure 13:
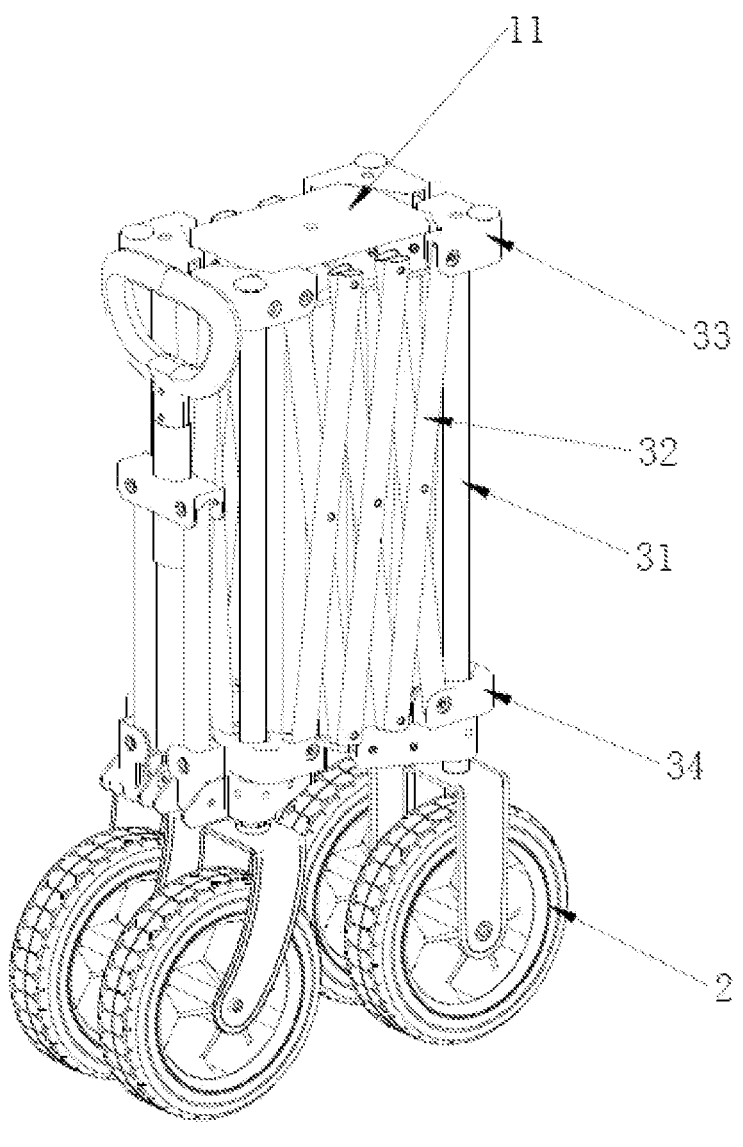
FIG. 13 is a three-dimensional diagram of a hand trolley with a fence in a folded state according to the present invention.
Figure 14:
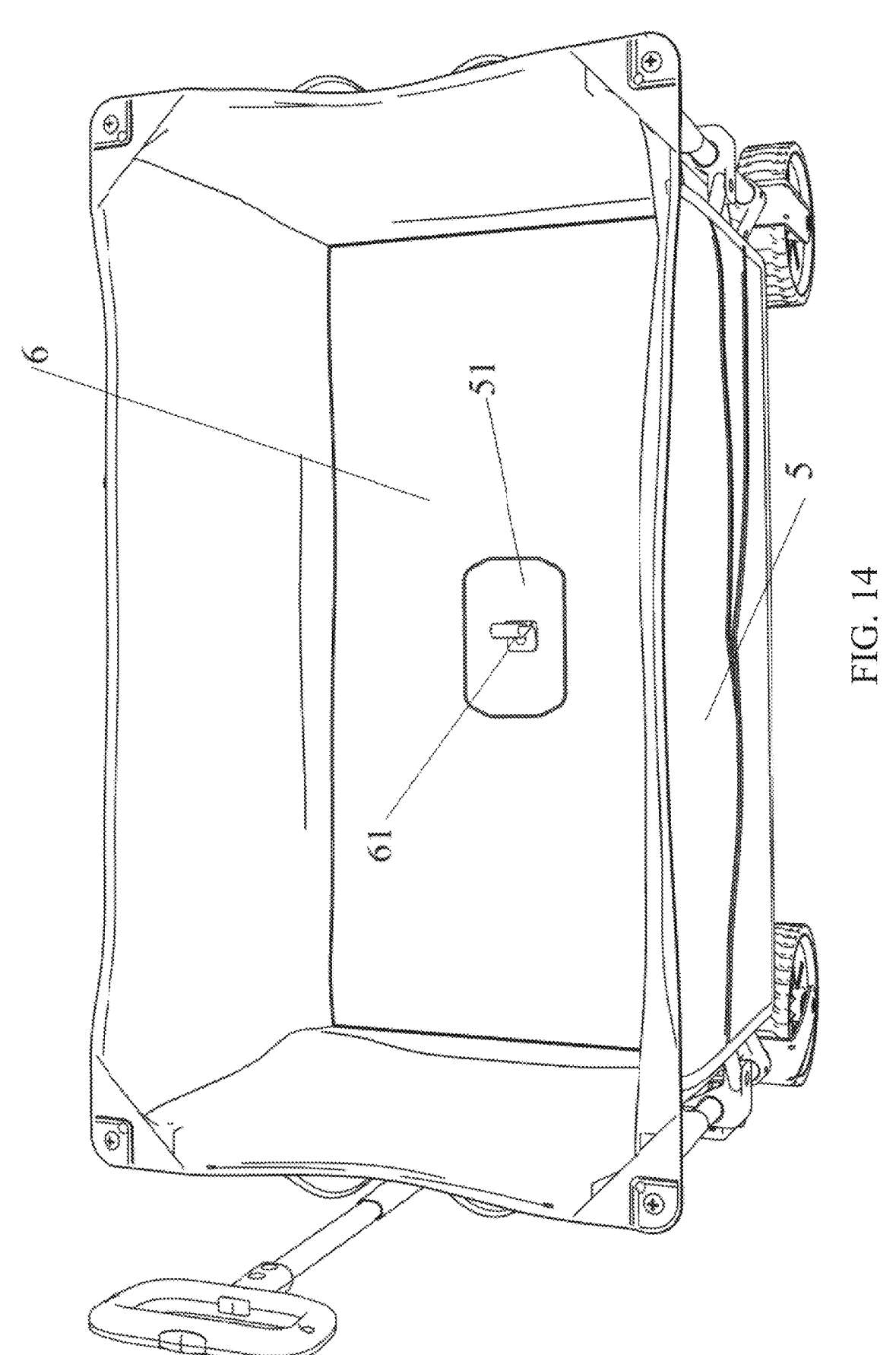
FIG. 14 is a top view of a hand trolley with a tarpaulin assembled in an unfolded state according to the present invention.

Folding operation steps of the hand trolley with the fence are as follows: As shown in FIG. 11 to FIG. 13, pull the handle upward to drive the central joint 11 to move upward. The ground wheel 2 is driven by the connection assembly 12 and the corner joint 13 to move towards a direction close to the central joint 11, the top end of the edge rod 32 moves downward, and the side blocking structure is gradually contracted, so that the support and the tarpaulin of the hand trolley are folded. The pull rod 4 is contracted downward and the contracted pull rod 4 abuts against one side of the support. The storage belt is wrapped around the outside of the hand trolley, to complete the folding of the hand trolley.

To unfold the hand trolley, the above folding steps only need to be carried out in reverse. After the central joint 11 is pressed in place, the hand trolley is locked by the first limiting portion 113 and the second limiting portion 133.

Although the present invention is specifically shown and described with reference to preferred embodiments, a person skilled in the art should understand that, without departing from the spirit and scope of the present invention defined by the appended claims, both formal and detailed changes made to the present invention fall within the protection scope of the present invention.

The invention claimed is:

1. A bottom support structure of a hand trolley, comprising a bottom frame and ground wheels disposed under the bottom frame, wherein the bottom frame comprises one central joint, at least three groups of connection assemblies, and at least three corner joints, one end of each of the connection assemblies is hingedly connected to the central joint, a second end of each of the connection assemblies is hingedly connected to one of the corner joints, and each of the corner joints is connected to one of the ground wheels, so that the bottom frame forms a foldable structure that is selectively unfolded or folded;

one of the connection assemblies comprises a first connection piece and a second connection piece, and when the bottom frame is unfolded, the first connection piece is located on the second connection piece, so that the bottom frame forms a double-layer structure;

one end of the first connection piece is hingedly connected to the central joint to form a first rotation center, and a second end of the first connection piece is hingedly connected to the one of the corner joints to form a second rotation center;

one end of the second connection piece is hingedly connected to the central joint to form a third rotation center, and a second end of the second connection piece is hingedly connected to the one of the corner joints to form a fourth rotation center; and a line connecting the first rotation center and the third rotation center is parallel to a line connecting the second rotation center and the fourth rotation center, and when the bottom frame is unfolded, the first connection piece abuts against an upper portion of the second connection piece.

2. The bottom support structure of a hand trolley according to claim 1, wherein the first rotation center, the second rotation center, the third rotation center, and the fourth rotation center are sequentially connected to form a parallelogram.

3. The bottom support structure of a hand trolley according to claim 2, wherein the central joint comprises at least three hinge portions, a first hinge hole and a third hinge hole are provided on each of the hinge portions, and the first hinge hole is hingedly connected to the first connection piece, so that a center of the first hinge hole is the first rotation center; the third hinge hole is hingedly connected to the second connection piece, so that a center of the third hinge hole is the third rotation center; and with a direction relatively close to the central joint as an inner side and a direction relatively far away from the central joint as an outer side, the first hinge hole is provided on the outer side relative to the third hinge hole; and a second hinge hole and a fourth hinge hole are provided on the one of the corner joints, and the second hinge hole is hingedly connected to the first connection piece, so that a center of the second hinge hole is the second rotation center; the fourth hinge hole is hingedly connected to the second connection piece, so that a center of the fourth hinge hole is the fourth rotation center; and the second hinge hole is provided on the outer side relative to the fourth hinge hole.

4. The bottom support structure of a hand trolley according to claim 3, wherein the first hinge hole and the third hinge hole are provided at a same height, the second hinge hole and the fourth hinge hole are provided at a same height, both the first connection piece and the second connection piece are in a strip shape, the first connection piece is bent downward at a location close to the second hinge hole to form a first bending portion, and the second connection piece is bent upward at a location close to the third hinge hole to form a second bending portion.

5. The bottom support structure of a hand trolley according to claim 4, wherein each of the hinge portions is in a shape of a groove with an opening downward, each of the first hinge hole and the third hinge hole is provided on a side wall of the groove, a first limiting portion is disposed on a top wall of the groove, and when the bottom frame is unfolded, each of the connection assemblies abuts against the first limiting portion; and each of the corner joints comprises a bottom frame connection portion, the bottom frame connection portion is in a shape of a second groove with an opening upward, each of the second hinge hole and the fourth hinge hole is provided on a side wall of the second groove, a second limiting portion is disposed on a bottom wall of the second groove, and when the bottom frame is unfolded, each of the connection assemblies abuts against the second limiting portion.

6. The bottom support structure of a hand trolley according to claim 3, wherein the first hinge hole is higher than the third hinge hole, the second hinge hole is higher than the fourth hinge hole, and both the first connection piece and the second connection piece are linear.

7. The bottom support structure of a hand trolley according to claim 3, wherein there are four groups of the connection assemblies, there are four of the corner joints and four of the hinge portions of the central joint, and the four of the hinge portions encircle to make the central joint form an "X" shape.

8. The bottom support structure of a hand trolley according to claim 7, wherein the central joint further comprises a connection portion, and the connection portion connects adjacent of the hinge portions, to integrally connect the hinge portions.

9. A hand trolley, comprising a support, a pull rod, and tarpaulin disposed on the support, wherein the support comprises the bottom support structure of the hand trolley according to claim 1 and a side support disposed on the bottom frame, the tarpaulin is connected to the support to form a container with an open top portion and a closed bottom portion and side surface, the pull rod is disposed on one side of the container, the side support comprises a side rod disposed on the bottom frame, and the side rod is a fixed rod with a fixed height.

10. The hand trolley according to claim 9, wherein the pull rod is a telescopic rod, and a handle is disposed inside the container, and the handle is connected to the central joint to pull the hand trolley to be folded.

11. The hand trolley according to claim 9, wherein the side rod is disposed in a corner of the bottom frame, a lower end of the side rod is connected to one of the corner joints, a telescopic cross side blocking structure is disposed between side rods, the telescopic cross side blocking structure is disposed in an encircling manner to form a fence, a top end of the telescopic cross side blocking structure and a top end of the side rod form a hinged connection relationship, and a lower end of the telescopic cross side blocking structure and the side rod form a compound connection relationship of a sliding connection and a hinged connection.

12. The hand trolley according to claim 11, wherein the telescopic cross side blocking structure comprises at least two edge rods, middle portions of the edge rods are hingedly connected to each other to form at least one X-shaped cross structure, a top end of each of the edge rods at an end portion of the telescopic cross side blocking structure and the top end of the side rod form a hinged connection relationship, and a bottom end of each of the edge rods at the end portion of the telescopic cross side blocking structure and the side rod form a second compound connection relationship of a sliding connection and a hinged connection.

13. The hand trolley according to claim 12, wherein there are four groups of the connection assemblies, there are four corner joints, a rectangular structure of the bottom frame is formed, a first side blocking structure located on a long edge of a rectangle comprises three X-shaped cross structures, and a second side blocking structure located on a short edge of the rectangle comprises two X-shaped cross structures.

14. The hand trolley according to claim 11, wherein a top joint is disposed at the top end of the side rod, the top joint is fixedly connected to the top end of the side rod, the top joint is hingedly connected to the top end of the telescopic cross side blocking structure, so that the top end of the telescopic cross side blocking structure and the top end of the side rod form a hinged connection relationship; and a movable joint is disposed at a middle portion of the side rod, the movable joint is sleeved outside the side rod to form a sliding connection to the side rod, and the movable joint is hingedly connected to the lower end of the telescopic cross side blocking structure, so that the lower end of the telescopic cross side blocking structure and the side rod form a compound connection relationship of a sliding connection and a hinged connection.

15. The hand trolley according to claim 9, wherein a top joint is disposed at a top end of the side rod, a telescopic side blocking structure is disposed between side rods, and a top end of the telescopic side blocking structure is hingedly connected to the top joint; and when the hand trolley is in a folded state, the telescopic side blocking structure extends downward, top surfaces of the top joint are located on a same horizontal plane, and the central joint of the bottom support structure is lower than the horizontal plane.

* * * * *